United States Patent
Fletcher et al.

[11] 3,781,111
[45] Dec. 25, 1973

[54] SHORT RANGE LASER OBSTACLE DETECTOR

[76] Inventors: James C. Fletcher, Administrator of the National Aeronautics & Space Administration, with respect to an invention of; William L. Kuriger, 912 Schulze Dr., Norman, Okla. 73069

[22] Filed: Mar. 16, 1972

[21] Appl. No.: 235,268

[52] U.S. Cl.................... 356/5, 356/4, 356/152, 250/217 SS, 350/6, 331/94.5 K, 331/94.5 S
[51] Int. Cl.............................................. G01c 3/08
[58] Field of Search................. 250/217 SS; 350/6; 356/157, 158, 141, 152, 4, 5; 331/94.5 K, 94.5 S

[56] References Cited
UNITED STATES PATENTS 3,691,390  9/1972  Chow et al. ............... 250/217 SS
3,668,409  6/1972  Tuhro et al. ............... 250/220 R

*Primary Examiner*—Benjamin A. Borchelt
*Assistant Examiner*—S. C. Buczinski
*Attorney*—Monte F. Mott et al.

[57] ABSTRACT

A short range obstacle detector for surface vehicles is provided by an array of laser diodes operated one at a time, one for each of a plurality of adjacent azimuth sectors. A vibrating mirror a short distance above the surface provides continuous scanning in elevation for all azimuth sectors. A diode laser selector is synchronized with the vibrating mirror to enable one diode laser to be fired by pulses from a clock pulse source a number of times during each elevation scan cycle. The time for a given pulse of light to be reflected from an obstacle and received is detected as a measure of range to the obstacle.

7 Claims, 3 Drawing Figures

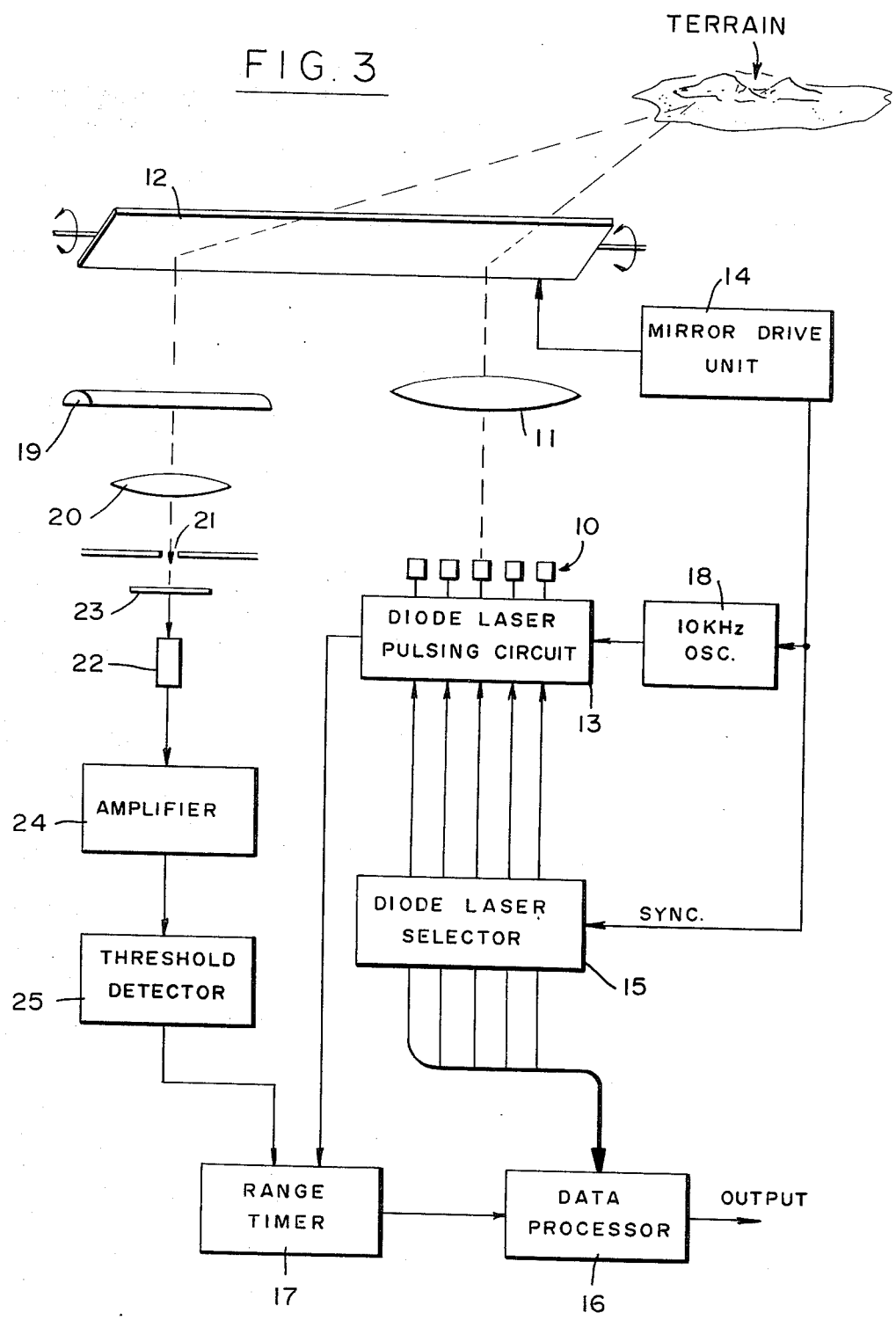

SHORT RANGE LASER OBSTACLE DETECTOR

ORIGIN OF THE INVENTION

The invention described herein was made in the performance of work under a NASA contract and is subject to the provisions of section 305 of the National Aeronautics and Space Act of 1958, Public Law 85-568 (72 Stat. 435;42 USC 2457).

BACKGROUND OF THE INVENTION

This invention relates to an obstacle detector for use on surface vehicles, and more particularly to an obstacle detector employing pulse-modulated laser beam to search for obstacles over a fixed area, i.e., over an area defined by predetermined azimuth and elevation scan angles.

Pulse-modulated electromagnetic energy systems have been proposed and used for many types of obstacle or target detecting apparatus, such as in conventional radar. However, such systems have been used only for ranging targets or obstacles at relatively great distances. For a surface vehicle searching for targets or obstacles on the surface, such as a ship, the scanning system is relatively simple and straightforward in that the system scans physically in azimuth while electronically scanning in range (by a technique referred to generally as range gating). To search for targets in the air from a surface vehicle, more complex scanning systems are employed, such as a raster scan, where a given sector is scanned in azimuth repeatedly, each time at a different elevation until the search has been completed through a predetermined elevation scan angle. The process is then repeated. Again, range gating techniques are employed to determine the range of any detected target.

For slow surface vehicles searching for obstacles or targets at close range of less than about 30 meters, the previously known scanning systems are not entirely satisfactory. In space exploration, for example, it is expected that a vehicle will be landed on the surface of a planet, such as the planet Mars. Initially, such vehicles will be unmanned. Because of the large and variable time delay involved in communications from the planet Earth to the planet under expoloration, such an unmanned vehicle would be required to travel on the surface of the planet with a minimum of external control from earth. Specifically, the vehicle would be required to detect obstacles and avoid them without any comunications with an earth bound station by computing small deviations required from an otherwise preplanned route. For that purpose, a suitable obstacle detector should permit the vehicle to sense obstacles such as boulders, small craters, and steep slopes in time to change heading.

At the present time it is contemplated that space exploration vehicles will travel over the surface of a planet at a typical rate of ½ km/h with a maximum speed of perhaps 1.5 km/h. Therefore, to be entirely satisfactory, the obstacle detection system should be capable of detecting targets with dimensions as small as 0.5 m at a range of typically 20 to 40 m.

Since the identification and avoidance of obstacles is greatly facilitated if range information about the obstacle is known, the only satisfactory form of an obstacle detector must be one capable of determining range. Weight, power, and sunlight parameters strongly favor a target detector having an active range finder using a semiconductor injection laser, i.e., a coherent light emitting diode, because of its small size and weight, and its compatibility with miniaturized electronics.

In order to detect and avoid obstacles, it would be necessary to scan a significant area in front of the vehicle. An arrangement which would appear to be best adapted to the task is one using electromagnetic irradiation in the infrared-optical region. By pulsing a diode laser, range information about any target may be readily obtained upon measuring the time required to receive an echo from the obstacle. A major problem encountered in providing such an obstacle detector is the provision of a proper scan mechanism.

An upper bound to the range at which the laser obstacle detector should operate is determined by the geometry of the situation. If it is assumed that the sensor is located at a height of two meters above the surface of the terrain, then even a gentle surface undulation would serve to mask negative obstacles such as pits and depressions at ranges much greater than about 20 meters, and would make it difficult to unambiguously discern the presence of a positive obstacle, such as a boulder. Let it be assumed that it is desirable to scan an area extending from a few meters out to 30 meters. This requires only a small vertical scan angle if the vehicle attitude and terrain surface are both level, but a considerable increase in scan angle is necessary to compensate for more realistic angles between vehicle attitude and the mean surface in front of the vehicle. Accordingly, a vertical scan angle for a distance out to 30 meters must be considered in order to achieve detection of an obstacle at a minimum distance of 6 or 7 meters.

The problems in scanning (azimuthally) are not quite so severe. A reasonable azimuthal scan angle would require only that the area observed in front of the vehicle to a distance of 30 meters be at least as wide as the swath of the vehicle. A wider azimuthal angle would be desirable if large numbers of obstacles are expected, but since that is not the case in space exploration, or in most earth-bound applications such as unmanned armored tanks and the like, alternate vehicle headings can be explored simply by steering away from detected targets until a path as wide as a swath of the vehicle is found.

Achieving the desired scan in azimuth and elevation without moving parts presents the most difficult problem of providing an obstacle detector. A large variety of electro-acoustic electro-optic, and piezoelectric beam deflection techniques exist, but none are capable of achieving sufficiently large scan angles without considerable complexity, and may not be at all satisfactory with a pulsed diode laser. Moreover, these techniques are best adapted to beams of very small diameter. For a practical obstacle detection system, both the transmitted and the received beam must have a diameter on the order of tens of millimeters.

If the expression "no moving parts" can be interpreted to mean no wearing parts, a suitable elevation scan can be achieved by use of a resonant vibrating mirror mounted on a resonant element such as a tuning fork or taut wire, thereby permitting the use of electromagnetic techniques for maintaining vibration at a constant rate. Considering a vibrating taut wire, the natural frequency of the wire held between two fixed suspension points can be predetermined and maintained. Any change of the length, or of the stress in the wire, causes a corresponding change of the natural oscillation frequency of the wire. In order to maintain the oscillation frequency constant, oscillation of the wire is detected and converted into an electric signal, usually by means of an inductive pickup near the oscillation wire. That signal is amplified and fed back into an electromagnet through an operational amplifier to keep the band excited in its natural frequency. Tuning fork and taut wire arrangements for vibrating mirrors are commerically available with drive units. A torsional type of fork for a vibrating mirror scanner is described by Frank Dostal in an article titled "Optical Scanner" published in the Mar./Apr. 1969 issue of Optical Spectra at pages 83 to 86.

SUMMARY OF THE INVENTION

In accordance with the present invention, an obstacle detector for use on surface vehicles employs a horizontal array of diode lasers properly positioned along the focal plane of a convergent lens to yield a fan-shaped horizontal scan pattern upon operating the diode lasers one at a time under control of a selecting means and a pulse timer. An elevation scan synchronized with the pulse timer is achieved by vibrating a mirror at a constant frequency and synchronizing the selecting means with the frequency of vibration maintained for the mirror such that only one of the diode lasers is operated during each elevation scan. During a given elevation scan, the diode laser selected for operation is pulsed at a predetermined rate with pulses of a duration of a few nanoseconds. The receiver portion of the obstacle detector is comprised of collecting optics, a photodetector, an amplifier, and a threshold detector.

The collecting optics consists of a cylindrical lens and a spherical lens which in combination collects radiation in a fan pattern corresponding to the laser beam azimuth scan pattern and focuses it through an aperture into the photodetector. The threshold detector rejects noise signals from the amplifier and allows timing means actuated at the time a diode laser is pulsed to make a range measurement based on the time it takes for the reflected pulse to be received after the diode laser is pulsed.

The novel features of the invention are set forth with particularity in the appended claims. The invention will best be understood from the following description when read in conjunction with the accompanying drawings.

BRIEF DESCRIPTION OF THE DRAWINGS

FIG. 3 shows in block diagram form a preferred embodiment of the present invention.

DESCRIPTION OF THE PREFERRED EMBODIMENTS

Figure 1:
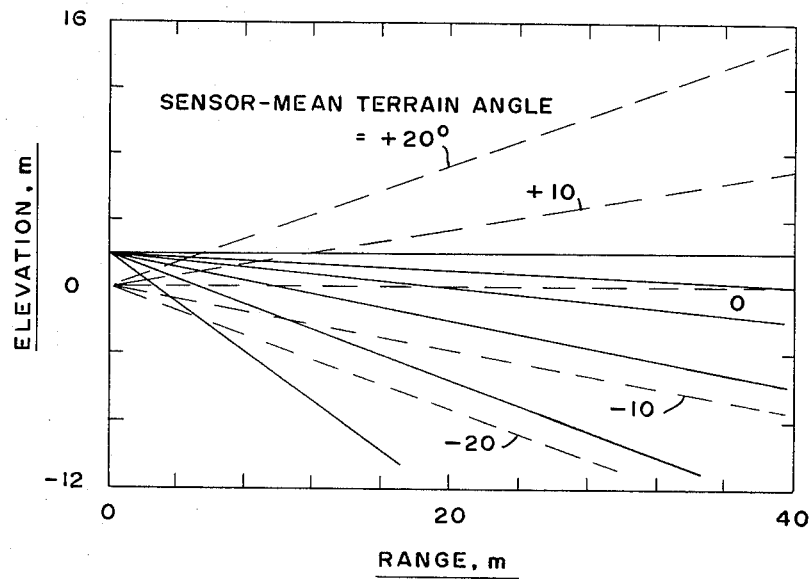
FIG. 1 is a diagram illustrating that only a small elevation scan angle is necessary to detect obstacles at a range from a few meters out to 30 meters on a level terrain surface.
Figure 2:
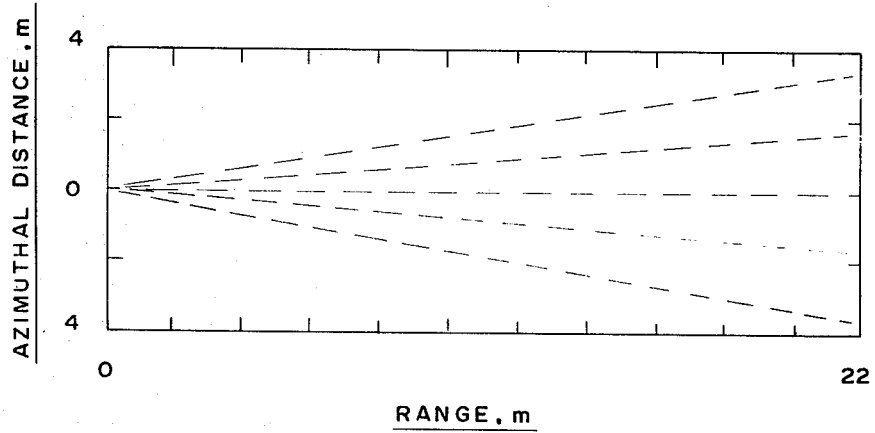
FIG. 2 illustrates an acceptable azimuth pattern for an obstacle detector.

Assuming that the obstacles detector is located at a height of two meters above the surface of the terrain, and that a 37° elevation scan is contemplated, then an obstacle detecting system would sweep a path in front of the vehicle from about 3 meters to 30 meters and beyond as is shown graphically in FIG. 1. However, this assumes that the vehicle attitude and the terrain surface are both level. If not, some increase in scan angle is necessary or some smaller range must be accepted for obstacle detection. The near distance for a negative relative terrain slope of 20° is then about 6 or 7 meters and the far distance for relative positive terrain slope of 20° is then about 6 or 7 meters. Accordingly, for an extreme range of a relative terrain slope of ±20°, an elevation scan angle of about 37° will enable an obstacle to be detected at a distance no closer than about 6 or 7 meters. At a vehicle speed of from 0.5 to 1.5 km/h, a minimum distance of 6 meters would allow the vehicle to take some action to avoid the obstacle, if the swath of the vehicle is about 2 meters as shown in FIG. 2, and the turning radius of the vehicle is not significantly greater than its swath. Assuming the swath of the vehicle is about 2 meters, a reasonable azimuth scan is then about 22° for a minimum obstacle detection range of about 6 meters as shown in FIG. 2.

Referring now to FIG. 3, a preferred embodiment of the present invention is shown in block diagram form. It employs an array 10 of five diode lasers properly positioned along the focal plane of a convergent lens 11 to give the azimuth pattern shown in FIG. 2. In that manner an azimuth scan pattern is produced while a vibrating mirror 12 is employed to scan in elevation over an angle of about 37° as shown in FIG. 1. Only one of the diode lasers in the array is operated during each elevation scan, so five elevation scans are required to complete the azimuth pattern of FIG. 2.

As FIG. 2 shows, the use of only five diode lasers at the particular chosen chose is marginal in that the azimuth beam width does not equal the vehicle width (assumed to be 2 meters) for ranges less than 6 or 7 meters, but the azimuth resolution is better than 0.5 m for ranges of less than about 7 meters. This situation is further alleviated by the fact that a particular portion of the scene will be scanned many times from slightly different aspects as the vehicle pitches and rolls to change its attitude relative to the terrain surface.

Each of the diode lasers is preferably a gallium-arsenide diode, and each is equipped with its own pulsing circuit 13. Each of these diode lasers has a typical output of 13 watts, and the emitting area is on the order of 3 × 225 $\mu$m. The defraction limited beam spread for the smaller laser dimension is on the order of 0.3 radians. Since the target area should be illuminated with a beam of the smallest possible diameter to minimize target induced pulse spreading and split returns, the collimating lens 11 is used. Accordingly, the lens 11 serves the dual function of collimating the pulsed laser beams and aiming them in the desired directions. The collimation is necessary to insure that the laser energy be concentrated in a reasonably small area, so that fairly small obstacles can be discerned. This dual function has the desired effect of collecting at least 80 percent of the radiation emitted by any one of the pulsed diode lasers and project it into a spot not larger than 0.1 m in diameter for ranges up to 30 m. A 25 mm $f$/3.2 simple lens would be satisfactory in this application. The diodes should be spaced at 6 mm intervals along the focal plane of the lens to achieve the scan coverage of FIG. 2. Individual adjustment of diode orientation will assure achievement of the desired results.

The mirror 12 is preferably vibrated at a frequency of 25 Hz with a ± 12.5° peak excursion (50° total beam deflection). A mirror 60 mm long and 30 mm wide, with the long axis parallel to the axis of rotation and parallel to the array of the diode laser 10, permits the transmitted and received beams to be side by side. This arrangement which does not require two separate vibrating mirrors avoids the problem of synchronization in the vertical scan for the transmitted and received beams. However, it might also be possible to use two separate vibrating mirrors if they are synchronized.

A mirror drive unit 14 maintains the frequency of vibration for the mirror at 25 Hz and also transmits the 25 Hz drive signal to a diode laser selector 15 and a data processor 16. The selector 15 responds to the synchronizing signal to activate the next diode laser in sequence while the mirror is moving through one half cycle to cause scanning an elevation to occur. Accordingly, the selector 15 may be implemented with a 5-stage ring counter to activate the diode lasers cyclically in a fixed sequence, but preferably during only one half cycle. The other half cycle may be blanked by the polarity of the sinusoidal signal employed to synchronize the mirror-drive unit. At the same time that a diode laser is activated, the circuit 13 transmits a signal to a range timer 17 each time the laser is pulsed. The range timer transmits range data to the data processor.

The data processor 16 also receives azimuth data from the selector 15 in order to compute from the range and azimuth data an output control signal for the vehicle to steer to the left or the right depending upon azimuth data, at a rate inversely proportional to the range data in order to avoid an obstacle. The data processor may also receive vehicle pitch and roll data in order to compensate the range data for vehicle attitude relative to the terrain, and to also compensate the azimuth data if desired.

The elevation scan produced by the vibrating mirror 12 is sinusoidal, but can be partially linearized by using only a portion of the mirror excursion. If the mirror attitude is set so that its equilibrium position is looking down from the horizontal by 0.15 rad (8.6°) and its usable scan angle is ± 2.5 rad (±14°), the full vertical scan will cover a range from 5 meters to infinity when the vehicle attitude and surface are level, and from 3 meters out to about 13 meters when the mean surface angle relative to the vehicle is −0.25 rad and from 13 meters out to infinity when the mean surface angle relative to the vehicle is +0.25 rad. Since the mean surface angle should be at the extreme of ±0.25 radians for only brief periods, this range for a fixed vertical scan angle would be adequate for detection of obstacles at a range from about 6 or 7 meters out to about 30 meters.

The beam swept out by the vertical scan moved at an angular rate of 68.5 radians per second in the vicinity of the mirror equilibrium points, so a transmitter pulse repetition rate of 10 KHz means that the terrain is sampled at 0.61 meter intervals at the midrange distance of 13.3 meters for the case of a level vehicle and a level terrain. A 10 KHz clock source 18 pulses the laser selected by the pulse timer 15 through a circuit 13 at this repetition rate. The clock source 18 may also be synchronized with the mirror drive unit.

The geometry of this vertical scan arrangement automatically results in finer resolution spaced at approximately 6 cm at a close range of 4 m and spaced progressively further apart at greater ranges. This result of progressively finer resolution at progressively closer ranges is an eminently sensible arrangement. Since only one diode laser is operated on each vertical scan, the entire field is scanned once each 0.2 sec. a time which is sufficiently short that the pitch and roll of the vehicle will only interfere occasionally with a scan.

Although only one diode laser is operated at a time, a vehicle traveling at a velocity of 0.139 meters per second (0.5 kilometers per hour) will detect a given obstacle 900 times in the range of 5 to 30 meters, assuming the nominal condition of a lvel vehicle attitude and a level terrain. This number of times a given obstacle is detected will be somewhat reduced by vehicle pitching which will at times reduce the range of a given vertical scan, but the number of times is still sufficiently large to avoid false alarms, by requiring that an obstacle be sensed several times in succession before the data processor 16 signals the presence of an obstacle and produces an output signal.

The receiver portion of the obstacle detector consists of collecting optics, comprised of a cylindrical lens 19, a simple 25 mm. spherical lens 20, an aperture 21, and a photodetector 22. The cylindrical lens 19 is followed by the simple lens 20 to produce a received beamwidth of 3 milliradians in elevation and 0.4 radians in azimuth. This particular beam shape includes in its field of view all of the azimuth angle which can be illuminated by the various diode lasers, but is otherwise as small as possible to reduce the amount of background solar radiation since the optical detector should be capable of operating in bright sunlight. In that manner the lenses and aperture serve to define the region of space from which radiation can impinge on the photodetector.

The collecting optics may also contain a 50 A. optical filter 23 to further discriminate against background radiation. The optical bandwidth is thus made as narrow as laser characteristics permit. Room temperature gallium-arsenide injection lasers emit a nominal wave length of 9020 A. with an output wave length spread on the order of Angstroms caused by pulsed operation and by heating within the duration of a pulse. There are differences between diodes on the order of tens of Angstroms because of material and processing variations, and the output wavelength shifts with diode temperature at a rate of approximately 1.75 A./°C. Accordingly, a 50 A. optical bandwidth provided by the filter 23 is a compromise between obtaining good background rejection and requiring tight wavelength control.

The photodector 22 may be one of any number of different devices commerically available such as a silicon PIN photodiode, an avalanche photodiode, or a photomultiplier tube. In each case, detection is based on threshold criteria. The choice of post detection bandwidth in an amplifier 24 coupling the photodetector 22 to a threshold detector 25 is dictated by the requirement of maintaining sufficiently fast rise time to preserve the pulse leading edge, and the bandwidth requirement in turn places an upper bound on the allowable load resistance.

In the preferred embodiment illustrated, signal detection is based on a threshold criterion. Accordingly, a single-to-noise ratio necessary in a particular application is determined by the need to set a threshold voltage level which is sufficiently high that noise peaks rarely produce a false alarm, but not so high that the system fails to detect weak obstacle returns. Since the sensor might detect a given obstacle as many as 900 times as the vehicle progresses, and since this calculation will result in a threshold which will be increasingly exceeded by the signal level as the range to the obstacle is reduced, a reasonable requirement is that a missed pulse should occur no oftener than once a minute, which in turn requires that the probability of the signal-present noise exceeding the mean signal-threshold difference be about $10^{-5}$. As suggested hereinbefore, the signal to noise requirement of the threshold detector can be relaxed if the data processor requires the presence of an obstacle to be detected a number of times before producing an output signal. This not only eases performance requirements, but also greatly reduces the probability of false alarms.

The interpretation of return signals to determine whether or not an obstacle is present can be accomplished in a variety of ways. One possible method is to use a fast range timer to measure the elapsed time between the emission of a pulse and the detection of the return. This information is then fed to the data processor along with azimuth data and vehicle attitude (pitch and roll)information. Since the angular coordinates of each pulse are known from timing considerations, the data processor can be programmed to distinguish obstacles to any desired degree consistent with the sensor resolution. The ranging accuracy expected is in the order of ± 10 cm.

Another possible method, which might not require the use of the data processor, is to convert each elevation scan into an analog waveform containing the desired information. For example, if a fast ramp is initiated when a pulse is transmitted, and then terminated upon receipt of a return signal or after 200 ns (the time for a signal to travel 30 m and return), whichever comes first, range information will be presented as a sequence of equally spaced sawtooth pulses whose peak amplitudes are proportional to range. Accordingly, the range timer 17 may be considered to be of either the conventional type employing digital techniques or this alternate type employing analog techniques.

Considering the analog technique of range timing, the resulting pulse train for each individual sweep would increase approximately quadratically in amplitude with time on a scale determined by the angle between the vehicle and the terrain. The presence of a positive obstacle, such as a boulder, would be manifested by a smaller than normal, or even a negative change in the amplitude of successive pulses while the larger than expected change would indicate the presence of a negative obstacle, such as a fresh crater. This technique of comparing each pulse with the amplitude of a preceeding pulse in a vertical scan from close to far range ignores nearly all of the information in the return but looks specifically for the most characteristic indication of an obstacle, namely the presence of a discontinuity in range. This same technique of observing discontinuity in range could also be implemented in the data processor using a digital range timer as well as an analog range timer.

Use of the analog range timer is specifically referred to only because the concept is easier to visualize in terms of successive sawtooth pulses at peak amplitudes proportional to the time of a pulse return from the obstacle. However, it is not intended that the data processor be limited to the detection of obstacles on the basis of pulse to pulse timing differences alone since the angle between the vehicle and mean terrain is a sufficient factor, that is to say, since the pitch and roll of the vehicle will affect the pulse to pulse differences. In other words, it is contemplated that the differences be programmed to receive vehicle attitude data as well as azimuth data in order that obstacle range data, or pulse to pulse differences, be corrected for changes in vehicle attitude.

Although particular embodiments of the invention have been described and illustrated herein, it is recognized that modifications and variations may readily occur to those skilled in the art. For example, it is desirable to minimize the detector's field of view so that the last amount of stray light (sunlight as opposed to laser light) is collected. Ideally, a spherical lens and aperture would be used without the cylindrical lens so that the only area of terrain from which radiation could reach the photodetector would be coincident with the area illuminated by the laser diodes. The cylindrical lens is included in the preferred embodiment to spread the receiver beam into a fan shape. The photodetector receives light from a greater area than is being illuminated by the laser diodes, but the extra light so collected is a tolerable amount. The advantage of the fan-shaped receiver pattern is that it removes any need to scan the field of view in azimuth, but the field of view could be scanned in azimuth with a linear array of photodetectors gated on sequentially in synchronism with the selected laser diodes. Consequentially, it is intended that the claims be interpreted to cover such modifications and variations.

What is claimed:

1. A laser scanning system comprised of
a linear array of lasers,
means for selecting for operation one laser at a time in a predetermined sequence,
means for pulsing each laser selected a number of times to produce a pulsed beam before another laser is selected,
optical means for collimating said pulsed beam of each laser and aiming it in the desired direction to form a fan-shaped azimuth scan pattern of pulsed beams,
means for cyclicly deflecting said azimuth scan pattern in elevation, said deflecting means being synchronized with said selected means to complete one cycle of deflection while one laser is being selected,
a photodetecting means mounted near said array of lasers, and
optical means for receiving reflected pulsed laser beams and directing said reflected pulsed laser beams into said photodetecting means.

2. A laser scanning system as defined in claim 1 wherein said optical means for receiving reflected pulsed laser beams and directing said reflected pulsed laser beams into said photodetecting means includes a spherical lens and an aperture which in combination limit the area from which radiation could be directed into said photo-detecting means to the area being illuminated by the combination of said deflecting means and any one of said pulsed laser beams, and means for scanning said area in elevation, said elevation scanning means being synchronized with said deflecting means for deflecting in elevation said azimuth scan pattern of pulsed beams.

3. A laser scanning system as defined in claim 2 wherein said deflecting means is comprised of one end of a vibrating mirror and said elevation scanning means comprises another end of said vibrating mirror.

4. A laser scanning system as defined in claim 3 wherein said photodetecting means is comprised of a single photodetector and said optical means for receiving reflected pulsed laser beams includes a cylindrical lens between said deflecting means and said spherical lens for providing a horizontal fan-shaped field of view, thereby obviating any need for scanning received pulsed laser beams in azimuth.

5. A laser scanning system as defined in claim 2 wherein said photodetecting means is comprised of a single photodetector and said optical means for receiving pulsed laser beams includes a cylindrical lens in front of said spherical lens for providing a horizontal fan-shaped field of view, thereby obviating any need for scanning received pulsed laser beams in azimuth.

6. A laser obstacle detector mounted on the front of a moving vehicle at a small distance above the surface of the terrain comprised of
- a convergent lens
- a plurality of lasers arranged in a horizontal array along the focal plane of said convergent lens to transmit a fan-shaped pattern of laser beams for a predetermined angle of scan in azimuth as said lasers are activated one at a time in a predetermined sequence,
- a vibrating mirror positioned to oscillate about an axis parallel to said array of lasers thereby to receive a beam from a given laser and to deflect it in elevation,
- means for maintaining vibration of said mirror at a substantially constant frequency,
- means for selectively activating said lasers for operation in said sequence in synchronism with said vibrating mirror, only one laser being activated during each cycle of vibration,
- means for pulsing a selected laser at a predetermined repetition rate during a cycle of said vibrating mirror, thereby effectively scanning a sector of said azimuth pattern in elevation with time spaced pulses of light,
- a cylindrical lens having its cylindrical axis parallel to the axis of oscillation of said mirror, said cylindrical lens being positioned to receive reflected returns of said laser beams from said mirror and to provide a field of view in a fan shape corresponding to the azimuth fan-shaped scan pattern of transmitted laser beams,
- a photodetector,
- a spherical lens following said cylindrical lens to focus the fan-shaped field of view into said photodetector, and
- means responsive to said photodetector and said pulsing means for producing a signal proportional to the time lapse between the time a laser is pulsed and the time a reflected pulse of light is received and detected by said photodetector after each pulsing of a lesser.

7. A laser obstacle detector as defined in claim 6 including data processing means connected to receive signals from said range measuring means and said laser selecting means for determining the presence and azimuth of obstacles.

* * * * *